US006568452B1

(12) United States Patent
Kano et al.

(10) Patent No.: US 6,568,452 B1
(45) Date of Patent: May 27, 2003

(54) ATTACHMENT APPARATUS FOR DISC PROTECTIVE SHEET AND ATTACHMENT METHOD THEREFORE

(75) Inventors: Kenichi Kano, Miyagi (JP); Takahiko Fukushima, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/554,623

(22) PCT Filed: Sep. 21, 1999

(86) PCT No.: PCT/JP99/05165
§ 371 (c)(1),
(2), (4) Date: Jul. 17, 2000

(87) PCT Pub. No.: WO00/17878
PCT Pub. Date: Mar. 30, 2000

(30) Foreign Application Priority Data

Sep. 21, 1998 (JP) .......................................... 10-266983

(51) Int. Cl.⁷ ............................................... B32B 31/20
(52) U.S. Cl. .................... 156/556; 156/566; 156/583.1; 156/290; 360/99.01; 428/65.5
(58) Field of Search ................................. 156/556, 566, 156/256, 264, 290, 516, 517, 519, 521, 542, 552, 553, 558, 557, 559, 560, 567–572, 580, 580.1, 583.1, 583.3, 581, 583.2; 360/97.04, 99.01, 254.1; 428/64.6, 65.5; 369/30.65

(56) References Cited

U.S. PATENT DOCUMENTS 4,160,689 A * 7/1979 Altermatt ..................... 100/237
4,960,480 A * 10/1990 Iwamoto ....................... 156/256
5,085,723 A * 2/1992 Nakaki et al. ................. 156/250
5,115,961 A * 5/1992 Nakajima ................... 156/580.1
6,007,659 A * 12/1999 Hasegawa .................... 144/348

FOREIGN PATENT DOCUMENTS

JP            62-45774        3/1987
JP            6-11175         2/1994

* cited by examiner

Primary Examiner—Michael W. Ball
Assistant Examiner—Jessica Rossi
(74) Attorney, Agent, or Firm—Sonnenschein, Nath & Rosenthal

(57) ABSTRACT

An attachment apparatus for disc protective sheet which is adapted for attaching disc protective sheet for protecting disc rotatably accommodated within a cartridge body formed by connecting or joining a pair of upper and lower halves with respect to the surface opposite to the disc of the half. This apparatus comprises a supporting mechanism for supporting halves constituting the cartridge body to which disc protective sheets are attached, a supply mechanism for supplying disc protective sheet to the half, the disc protective sheet being such that a cut portion larger than an opening portion provided at the half and facing a portion of the disc toward the external is provided and a thermal fusible layer is provided on the attachment surface of the surface opposite to the disc of the half in the state where the thermal fusible layer is opposed to the surface opposite to the disc of the half and the cut portion is caused to correspond to the opening portion, and a fusing mechanism having outer shape slightly larger than that of the disc protective sheet and disposed in a manner opposite to the supporting mechanism, the fusing mechanism serving to fuse the thermal fusible layer of the disc protective sheet delivered to the half to fixedly fuse the disc protective sheet onto the half. When the supporting mechanism is moved toward the fusing mechanism side so that the fusing mechanism and the supporting mechanism are relatively moved, the disc protective sheet is fixedly fused onto the surface opposite to the disc of the half by the fusing mechanism.

7 Claims, 7 Drawing Sheets

ATTACHMENT APPARATUS FOR DISC PROTECTIVE SHEET AND ATTACHMENT METHOD THEREFORE

BACKGROUND OF THE INVENTION

1. Technical Field of the Invention

This invention relates to an attachment apparatus for a disc protective sheet, which is adapted for attaching, to halves constituting a cartridge body, a disc protective sheet attached on the surface opposite to the disc of the cartridge body within which the disc is rotatably accommodated, the protective sheet being adapted to sweep foreign materials such as dust, etc. attached to the disc to thereby protect the disc, and an attachment method therefor.

2. Description of the Related Art

Hitherto, in a disc cartridge for rotatably accommodating a magnetic disc within a cartridge body, in order to prevent the magnetic disc from being polluted by dust admitted into the cartridge body, a disc protective sheet is attached on the surface opposite to the magnetic disc of the cartridge body. This disc protective sheet is formed by punching unwoven cloth in the state where it has an outer shape slightly larger than an outer shape of the magnetic disc, and is substantially circular.

In the assembly process steps of the disc cartridge, such disc protective sheets are respectively attached, by an attachment apparatus for a disc protective sheet, on surfaces opposite to the magnetic disc of the upper and lower halves constituting a cartridge body. This attachment apparatus includes a supply mechanism for supplying disc protective sheets onto the inner surfaces of the upper and lower halves carried by a conveyer, etc., and a fixing mechanism for fixing the disc protective sheets at the periphery of recording/reproduction opening portions of the inner surfaces of the upper and lower halves. The fixing mechanism includes a head portion for pressing the disc protective sheets onto the inner surfaces of the upper and lower halves, wherein plural pressing pieces for pressing the disc protective sheet are formed in a saw-tooth form in a manner perpendicular to the pressing surface onto the pressing surfaces for pressing the disc protective sheets of this head portion. These pressing pieces are formed so as to have the ability to press the disc protective sheet onto the peripheral edge portion of the recording/reproduction opening portion. In addition, a heating portion for heating the head portion is provided at the fixing mechanism.

In such an attachment mechanism, when disc protective sheets are delivered to the internal surfaces of the upper and lower halves by the supply mechanism, the disc protective sheets are fixedly fused at peripheries of the recording/reproduction opening portions of the internal surfaces of the upper and lower halves by a fixing mechanism. Specifically, the fixing mechanism presses the head portion heated by the heating portion onto the disc protective sheet. Because saw-tooth shaped pressing pieces are heated by the heating portion, the head portion bites the disc protective sheets into the periphery of the recording/reproduction opening portions of inner surfaces of the upper and lower halves so that they are fixed.

In such an attachment apparatus for disc protective sheet, since the disc protective sheets are fixedly fused at peripheries of the recording/reproduction opening portions of the upper and lower halves and are only attached thereat, the attachment state of other portions of the disc protective sheet becomes unstable, resulting in instances where dust attached on the magnetic disc cannot be completely swept. Particularly, in the case of the magnetic disc onto which information signals are recorded at high density, when dust attached to the magnetic disc cannot be swept, a recording/reproduction error may be apt to take place. Moreover, since such an attachment unit is adapted so that the fixing mechanism partially presses the peripheries of the recording/reproduction opening portion of the upper and lower halves, the upper and lower halves may be deformed. Further, since the disc protective sheets are adapted so that since the entire surfaces are not fixedly fused at the upper and lower halves, there are instances where the disc protective sheet may be bent within the cartridge body and the attachment position of the disc protective sheet deviates so that a portion of the disc protective sheet may be protruded toward the external from the recording/reproduction opening portion.

SUMMARY OF THE INVENTION

In view of the above, an object of this invention is to provide an attachment apparatus for a disc protective sheet and an attachment method therefor which can fixedly fuse the disc protective sheet onto the surface opposite to the disc half, and which can fixedly fuse, efficiently and reliably, the disc protective sheet onto the half constituting part of the cartridge body.

An attachment apparatus for a disc protective sheet according to this invention is an attachment apparatus for a disc protective sheet, wherein the disc protective sheet for protecting the disc is rotatably accommodated within the cartridge body formed by connecting a pair of upper and lower halves, and is attached on the surface opposite to the disc of at least one half. This apparatus includes a supporting mechanism having an outer shape slightly larger than the disc protective sheet and for supporting a half constituting a cartridge body to which a disc protective sheet is attached; a supply mechanism for supplying the disc protective sheet to the half, the disc protective sheet being such that a cut portion slightly larger than an opening portion is provided at the half and facing a portion of the disc to the external; a thermal fusible layer provided on an attachment surface with respect to the surface opposite to the disc of the half, wherein the thermal fusible layer is opposed to the surface opposite to the disc of the half and the cut portion is caused to correspond to the opening portion; and a fusing mechanism having an outer shape slightly larger than the disc protective sheet and disposed in a manner opposite to the supporting mechanism, the fusing mechanism serving to fuse the thermal fusible layer of the disc protective sheet fixedly to the half.

Since the supporting mechanism is moved to the fusing mechanism side so that the fusing mechanism and the supporting mechanism are relatively moved, the disc protective sheet delivered to the surface opposite to the disc of the half constituting the cartridge body is fixedly fused onto the surface opposite to the disc of the half, by the fusing mechanism, wherein the half is placed between the fusing mechanism and the supporting mechanism. The supporting mechanism includes a supporting member for supporting the half. This supporting member is formed by an elastic member and is adapted so that groove portions are formed at the supporting surface side for supporting the half. The supporting member having a supporting surface at which groove portions are formed is easily deformed in a manner to absorb distortion such as a warp of the half mounted on the supporting surface, etc., thereby making it possible to uniformly support the entire surface of the half. Thus, the disc protective sheet can be fixedly and securely fused onto the half.

Moreover, the engagement portion of the positioning mechanism for carrying out the positioning of the cartridge body, is engaged with the opening portion of the half. Further, in fixedly fusing the disc protective sheet onto the half, the half is pressed toward the supporting mechanism side by a pressing mechanism. The disc protective sheet is provisionally fixed or attached at the peripheral edge portion of the opening portion of the half by a provisional attachment or fixing mechanism before it is fixedly fused onto the half, thereby making it possible to securely fuse the attachment surface of the protective sheet at a predetermined position.

An attachment method for the disc protective sheet according to the invention is directed to a method for attaching, onto the surface opposite to the disc of at least either one half, the disc protective sheet for protecting the disc rotatably accommodated within the cartridge body formed by connecting a pair of upper and lower halves. The method includes a step of supplying the disc protective sheet to a half, the disc protective sheet being such that a cut portion, being relatively larger than that of an opening portion, is provided at the half, for facing a portion of the disc toward the external, and a thermal fusible layer is provided at the attachment surface with respect to the surface opposite to the disc of the half; wherein the thermal fusible layer is opposed to the surface opposite to the disc of the half and the cut portion is caused to come in correspondence with the opening portion, and wherein the fusing of the thermal fusible layer of the disc protective sheet delivered to the half is performed to fixedly fuse the disc protective sheet onto the half.

At the preceding step of fixedly fusing the disc protective sheet with respect to the half, a thermal fusible layer of a cut portion peripheral edge portion of the disc protective sheet which is delivered to the half, is fused. Thus, the disc protective sheet is fixedly fused onto the peripheral portion of the opening portion so that it is provisionally fixed or attached.

Still further objects of this invention and more practical merits obtained by this invention will become apparent from the description of the embodiments which will be given below.

DETAILED DESCRIPTION OF THE PREFERRED EMBODIMENTS

A more practical example of an attachment apparatus and an attachment method for a disc protective sheet according to the invention will now be described with reference to the attached drawings. The disc protective sheet attached by this attachment apparatus is used in a disc cartridge for rotatably accommodating a magnetic disc with respect to cartridge body.

Figure 2:
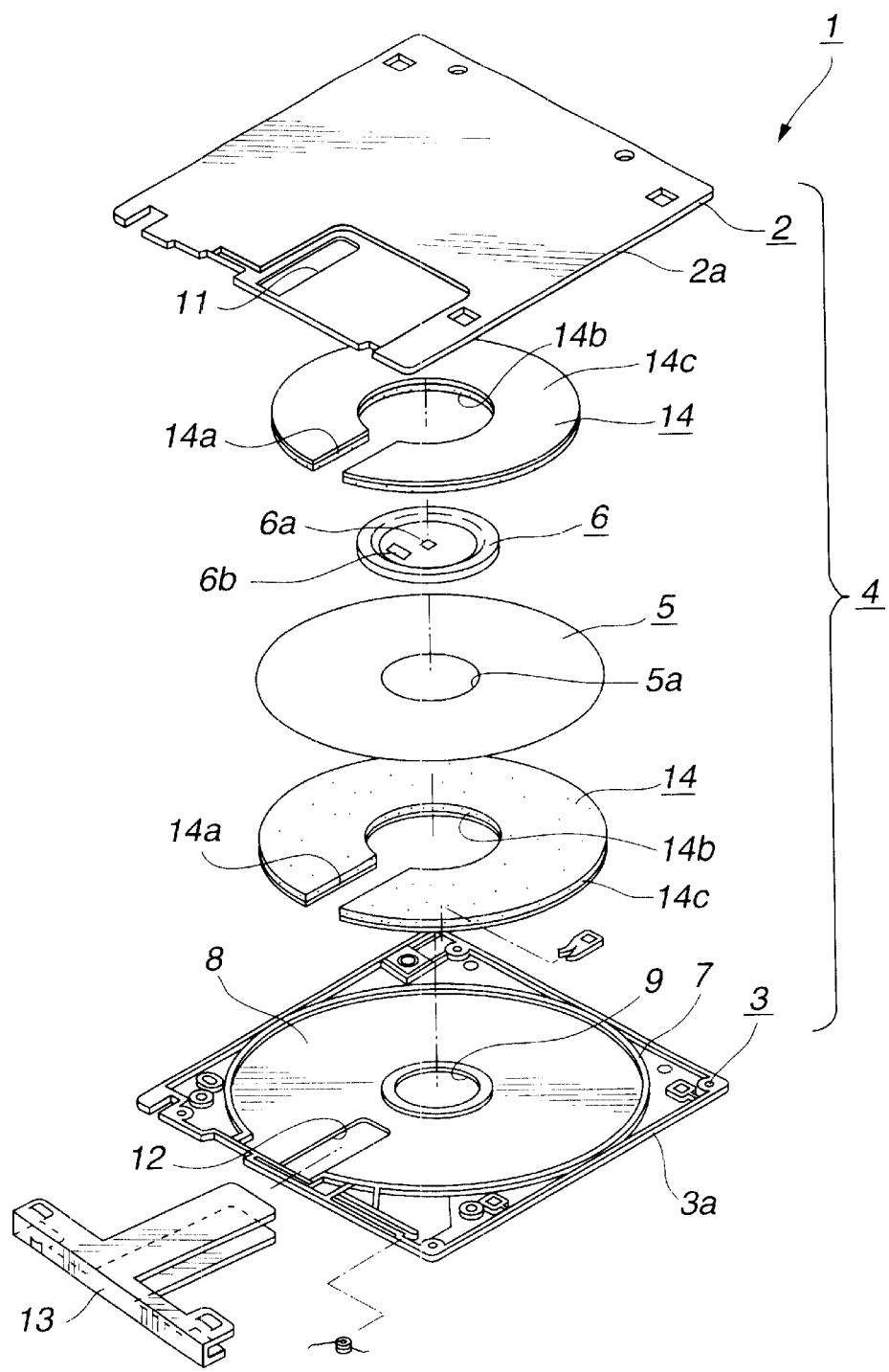
FIG. 2 is an exploded perspective view showing a disc cartridge in which disc protective sheets are used.

A disc cartridge 1 to which protective sheets are attached by the attachment apparatus and the attachment method for a protective sheet according to this invention includes, as shown in FIG. 2, a cartridge body 4 in which a pair of upper and lower halves 2, 3 are butt-joined, wherein a magnetic disc 5 onto which information signals are recorded, is accommodated within the above-mentioned cartridge body 4. The magnetic disc 5 has a diameter of 3.5 inches and a recording capacity of several hundreds of M bytes. Moreover, the magnetic disc 5 is of a structure such that magnetic layers serving as signal recording layers are formed on both surfaces of the disc base which is formed of a synthetic resin having flexibility. The magnetic disc 5 is adapted so that center hole 5a is bored at the central portion thereof, and a signal recording area is formed at the outer circumferential side of the center hole 5a. A hub 6 consisting of magnetic material such as a metallic plate, etc., is attached at the magnetic disc 5 in such a manner as to close the center hole 5a. A substantially regular square engagement hole 6a with which a spindle of a disc rotational operation mechanism, for carrying out a rotational operation of the magnetic disc 5, is engaged, is bored at the central portion of the hub 6, and a substantially rectangular drive pin insertion hole 6b with which a drive pin of the disc rotational operation mechanism is engaged, is bored at the position shifted by a predetermined distance from the engagement hole 6a.

An upper half 2 and a lower half 3 constituting the cartridge body 4 can be easily molded by using an injection molding method, etc., and can be molded with high accuracy. Further, they are formed by a synthetic resin material having a sufficient mechanical strength. Moreover, at the internal surfaces opposite to each other of the upper half 2 and the lower half 3, there are provided position limiting walls 7,7 for limiting an accommodating position in a horizontal direction of the disc 5 accommodated within the cartridge body 4. The position limiting walls 7,7 are provided so as to inscribe rising circumferential walls 2a, 3a vertically provided at the periphery of the upper half 2 and the lower half 3, and constitutes a disc accommodating portion 8 for rotatably accommodating the magnetic disc 5 within the cartridge body 4 when the upper half 2 and the lower half 3 are butt-joined to each other so that the cartridge body 4 is constituted.

At the central portion of the lower half 3, there is provided a central opening portion 9 facing the hub 6 toward the external. Moreover, at the upper half 2 and the lower half 3, there are provided opening portions or openings 11, 12 for recording and/or reproduction facing toward the external over inner and outer circumferences, a portion of the magnetic disc 5 extending over the front serving as an insertion end with respect to a recording and/or reproducing unit, from the central portion. Further, the opening portions 11, 12 are closed by a shutter 13 assembled so that it can be moved along the front portion of the cartridge body 4. The shutter 13 is adapted so that only when the disc cartridge is loaded within the recording and/or reproducing unit, it opens the opening portions 11,12 to thereby prevent foreign material such as dust, etc., from being admitted into the disc accommodating portion 8 at the time of non-use, when the disc cartridge is not loaded into the recording and/or reproducing unit.

The disc accommodating portion 8 is adapted to rotatably accommodate the magnetic disc 5, wherein there are disposed protective sheets 14, 14 for protecting the magnetic disc 5 accommodated therewithin, and for wiping foreign material such as dust or fingerprints, etc., attached on the surface of the magnetic disc 5. The protective sheets 14, 14 are formed by circularly punching unwoven cloth from a web, so that they are slightly larger than the magnetic disc 5. Moreover, in the protective sheets 14, 14, there are continuously formed cut-outs or cut portions 14a, 14b adapted so that they are slightly larger than the opening portions 11, 12 in outer shape, in correspondence with the opening portions 11, 12 provided at the upper half 2 and the lower half 3, with opening portions 14b adapted so that they are slightly larger than the central opening portion 9 in outer shape, in correspondence with the central opening portion 9 provided at the lower half 3. Further, in protective sheets 14, 14, there are respectively formed, on the entire surface, thermal fusible layers 14c on the attachment surface side with respect to the upper half 2 and the lower half 3. Such protective sheets are fixedly fused onto the inner surfaces of the upper half 2 and the lower half 3 constituting the disc accommodating portion 8 as the result of the fact that the respective thermal fusible layers 14c formed on the entire surface are fused by an attachment unit for protective sheets 14, 14 which will be described later.

The disc cartridge 1 thus constituted is adapted so that when it is not used, the shutter 13 is located at the position where it closes the opening portions 11, 12 to prevent foreign material from being admitted into the disc accommodating portion 8 from the opening portions 11, 12. Further, when the disc cartridge 1 is loaded with respect to the recording and/or reproducing unit with the front portion where the shutter 13 is assembled being as insertion end, the shutter 13 is caused to undergo a movement operation by a shutter opening mechanism of the recording and/or reproducing unit side, so that the opening portions 11, 12 are opened. Thus, a spindle of a disc rotational operational mechanism is engaged with the engagement hole 6a, whereby a drive pin is engaged with the drive pin insertion hole 6b so that the magnetic disc 5 is caused to undergo rotational operation. In addition, the magnetic head constituting the recording and/or reproducing mechanism is admitted from the opening portions 11, 12. Thus, the magnetic head carries out the recording and/or reproduction of information signals with respect to the magnetic disc 5 which is caused to undergo rotational operation.

Figure 1:
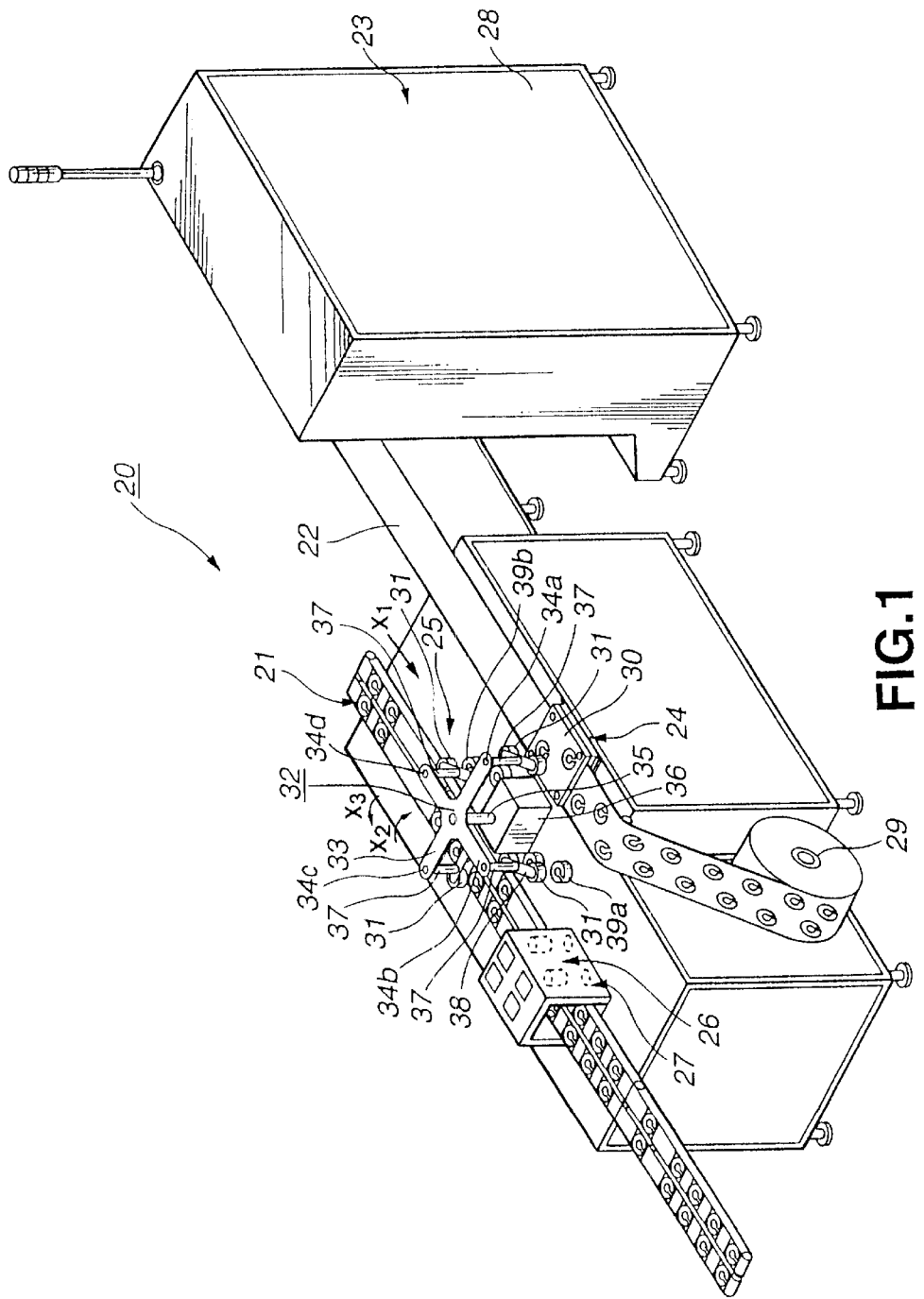
FIG. 1 is a perspective view showing an attachment apparatus for a disc protective sheet according to the invention.

An apparatus 20 for attaching protective sheets 14 with respect to the upper half 2 and the lower half 3 of such a disc cartridge 1 includes, as shown in FIG. 1, a carrying mechanism 21 for carrying in succession the upper and lower halves 2, 3, an original sheet supply mechanism 23 for supplying an original sheet 22 of the protective sheet 14, a punching mechanism 24 for punching an original sheet 22 delivered from the original sheet supply mechanism 23, to form protective sheets 14, a supply mechanism 25 for supplying protective sheets 14 punched by the punching mechanism 24 to the upper and lower halves 2, 3 carried by the carrying mechanism 21, a fusing mechanism 26 for fixedly fusing, onto the upper and lower halves 2, 3, the protective sheets 14 delivered to the upper and lower halves 2, 3, and a supporting mechanism 27 for supporting the upper and lower halves 2, 3 in fixedly fusing the protective sheets 14 with respect to the upper and lower halves 2, 3.

In such an attachment unit 20, when the upper and lower halves 2, 3 are carried by the carrying mechanism 21 up to a supply position where the protective sheets 14 are delivered to the upper and lower halves 2, 3, protective sheets 14 formed as the result of the fact that the original sheet 22 is punched by the punching mechanism 24 are delivered to predetermined positions of the upper and lower halves 2, 3 by the supply mechanism 25. In addition, the upper and lower halves 2, 3 to which the respective protective sheets 14 are delivered, are carried up to the attachment position for attaching the respective protective sheets 14 with respect to the upper and lower halves 2, 3, further from the supply position by the carrying mechanism 21. At this attachment position, the protective sheets 14 are attached as the result of the fact that they are fixedly fused onto the inner surface sides of the upper and lower halves 2, 3.

The carrying mechanism 21 for carrying the upper and lower halves 2, 3 is, e.g., a conveyor of the belt system, wherein, as shown in FIG. 1, a pair of upper and lower halves are carried wherein the front sides thereof are directed toward the travelling direction and the inner surfaces of the upper and lower halves 2, 3 are directed toward the upper side so that protective sheets 14 can be supplied by the supply mechanism 25. At this time, the upper and lower halves 2, 3 which are delivered to the carrying mechanism 21, are carried in a synchronized manner. Namely, one upper half 2 and one lower half are delivered to the carrying mechanism 21 as a pair, and the upper and lower halves set as a pair here are assembled at an assembling step for upper and lower halves 2, 3. The upper and lower halves 2, 3 are held by a holding mechanism 18 (see FIG. 3) provided at the conveyer in a parallel state and are carried in succession in a manner indicated by arrow $X_1$ in FIG. 1.

Figure 3:
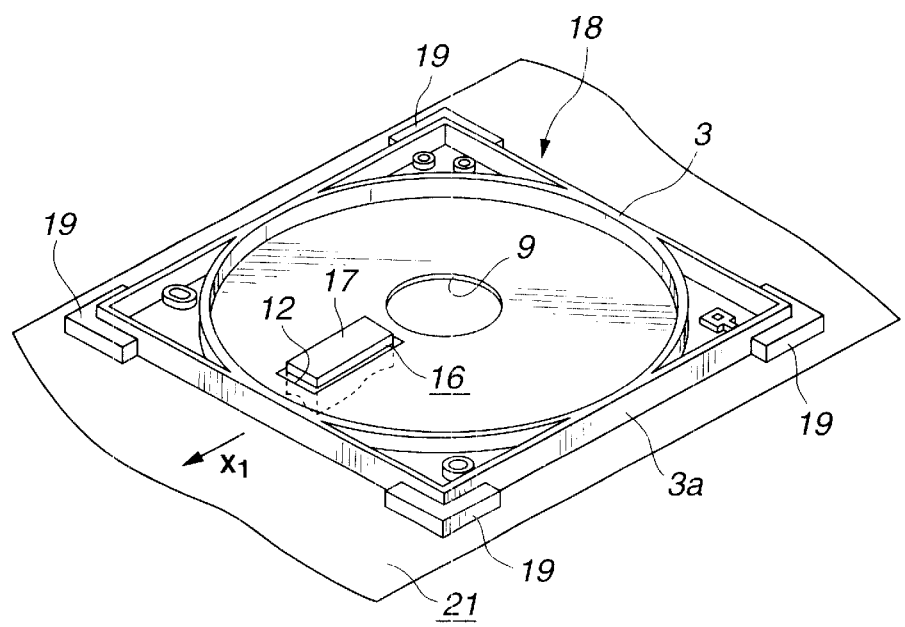
FIG. 3 is a perspective view of a holding mechanism for holding the upper and lower halves in carrying mechanism.

As shown in FIG. 3, this holding mechanism 18 is provided with four holding portions 19 formed substantially L-shaped, which are engaged with the outer circumferential sides of respective corner portions of the upper and lower halves 2, 3 to carry out the positioning of the upper and lower halves 2, 3. The upper and lower halves 2, 3 are carried in the direction indicated by arrow $X_1$ in FIG. 3, by a conveyer in the state where the respective halves are held by the holding portions 19. Moreover, at the holding mechanism 18, as shown in FIG. 3, there is provided a positioning mechanism 16 for the upper and lower halves 2, 3. The positioning mechanism 16 includes an engagement portion 17 engaged with opening portions 11, 12 of the upper and lower halves 2,3. The engagement portion 17 is formed so as to have substantially the same size as the opening portions 11, 12 and is disposed so that it is advanced and withdrawn with respect to the opening portions 11, 12. For example, the engagement portion 17 is engaged with the opening portions 11, 12 during carrying of the upper and lower halves 2, 3 to thereby realize positioning of these upper and lower halves 2, 3. This positioning mechanism 16 may be adapted so that, i.e., engagement portion 17 is engaged with the opening portions 11, 12 at all times during carrying of upper and lower halves 2, 3, or may be used at the testing step whether or not protective sheet 14, for which positioning accuracy of the upper and lower halves 2, 3 is particularly required, is attached at a predetermined position. In this example, FIG. 3 shows holding mechanism 18 for holding lower half 3.

As shown in FIG. 1, the original sheet supply mechanism 23 includes a supply portion 28 within which an original sheet 22 of the protective sheet 14 is accommodated to supply the original sheet 22 to the punching mechanism 24, and a winding reel 29 for winding the original sheet 22 sent out from the supply portion 28, and in which protective sheets 14 are punched by the punching mechanism 24. The original sheet 22 consists of elongated unwoven cloth as shown in FIGS. 1 and 2, and thermal fusible layers 14c for sticking the entire surfaces of the protective sheets 14 onto the inner surfaces of the upper and lower halves 2, 3 are formed at respective one surface sides serving as an attachment surface with respect to the upper and lower halves 2, 3. Further, the elongated original sheet 22 is traveled in the same direction as carrying direction of the upper and lower halves 2, 3 in parallel to the carrying mechanism 21, and is delivered from the supply portion 28 after protective sheets 14 are punched. The original sheet 22 is traveled in the direction indicated by arrow $X_1$ in FIG. 1 as the result of the fact that the winding reel 29 is driven so that the original sheet 22 is wound onto this winding reel 29. In this example, the winding reel 29 is driven in a manner synchronous with the carrying mechanism 21. Namely, the winding reel 29 is stopped when the carrying mechanism 21 is stopped and is re-driven when the carrying mechanism 21 restarts the drive. Thus, the original sheet supply mechanism 23 is adapted so that when the carrying mechanism 21 is stopped, the state results where protective sheets 14 cannot be delivered to the upper and lower halves 2, 3, the original sheet 22 is prevented from being carried, thus making it possible to eliminate wastefulness of the original sheet 22.

Moreover, the punching mechanism 24 for punching the original sheet 22 delivered from the original sheet supply mechanism 23 to form protective sheets 14, includes a cutter portion disposed in a manner opposite to the original sheet 22 and for punching the original sheet 22, and a holding plate 30 disposed in a manner opposite to this cutter portion and serving to hold the original sheet 22 in punching the original sheet 22. The cutter portion is formed so that the outer shape of the protective sheet 14 is caused to be a fundamental shape and the cut portion 14a and opening portion 14b can be punched. Such a punching mechanism 24 punches the original sheet 22 held by the holding plate 30 by advancing and withdrawing the cutter portion, thus to form the protective sheets 14.

Further, the supply mechanism 25 for carrying the protective sheets 14 formed by punching the original sheet 22 from the punching position of the original sheet 22 up to the supply position where such protective sheets are delivered to the upper and lower halves 2, 3 is disposed between the carrying mechanism 21 and the punching mechanism 24 as shown in FIG. 1. This supply mechanism 25 includes suction heads 31 for sucking and holding the protective sheet 14 located at the punching position of the punching mechanism 24, and a rotation arm mechanism 32 to which the suction heads 31 are attached, and for carrying, as the result of the fact that it is rotated, the protective sheet 14 from the punching position of the punching mechanism 24 up to the supply position where the upper and lower halves 2, 3 are positioned.

The suction head 31 is formed in such a manner that the suction surface for sucking the protective sheet 14 has substantially the same shape as the protective sheet 14. Further, at this suction surface, plural suction holes for sucking the protective sheet 14 are provided. The suction head 31 delivers the protective sheet 14 to the upper and lower halves 2, 3 in such a manner that the thermal fusible layers 14c of the protective sheets 14 are respectively opposed to the inner surfaces of the upper and lower halves 2, 3.

In this case, protective sheets used for the conventional disc cartridge have permeability or ventilation property because it is formed by a single unwoven cloth. On the contrary, since the protective sheet 14 used here is formed so that the thermal fusible layers 14c are provided on the attachment surface sides of the upper and lower halves 1, 2, and they have no permeability or no ventilation property, it is possible to suck and hold the protective sheets 14 by the sucking heads 31.

The rotation arm mechanism 32 includes a substantially cross shaped rotation arm 33, wherein the four first arm portions 34a, 34b, 34c and 34d are provided at the rotation arm 33. The rotation arm 33 is axially supported by a first support shaft 35 at the central portion thereof, and is caused to undergo a rotation operation by a drive mechanism 36. Specifically, this rotation arm 33 is driven so that it is rotated by substantially 90 degrees in a direction arrow indicated by arrow $X_2$ or in a direction indicated by arrow $X_3$ in FIG. 1. At front end portions of the respective first arm portions 34a, 34b, 34c, 34d, second support shafts 37 are provided. At the front ends of the second shafts, second arm portions are rotatably attached. The second arm portions are axially supported by the second support shafts 37 at the center, wherein suction heads 31 are attached at both end portions.

Moreover, in the supply mechanism 25, provisional mounting or attachment tables 39a, 39b are disposed between the carrying mechanism 21 and the punching mechanism 24. The provisional mounting tables 39a, 39b have substantially the same shape as the protective sheet 14. The first arm portions 34a, 34d carry a protective sheet 14 between the punching position where the original sheet 22 is punched and provisional mounting positions of the provisional mounting tables 39a, 39b, and the first arm portions 34b, 34c carry protective sheet 14 between the provisional mounting position of the provisional mounting tables 39a, 39b and supply position of the carrying mechanism 21.

Such a supply mechanism 25 operates as follows. For example, suction heads 31, 31 attached to the first arm portion 34a in FIG. 1 suck protective sheets 14, 14 located at the punching position. At this time, the suction heads 31, 31 of the first arm 34b suck and hold protective sheets 14, 14 located on the provisional mounting table 39a. In addition, suction heads 31, 31 of the first arm portion 34c are located at the supply position of the carrying mechanism 21, and the first arm portion 34d is located on the provisional mounting table 39b.

Further, when the rotation arm 33 is rotated by 90 degrees in the direction indicated by arrow $X_2$ in FIG. 1 by drive mechanism 36, suction heads 31, 31 of the first arm 34a are located on the provisional mounting table 39 to provisionally place, on the provisional mounting table 39, the protective sheet held at the punching position. At this time, suction heads 31, 31 of the first arm 34b are located at the supply position on the carrying mechanism 21 to deliver the held protective sheets 14, 14 onto the upper and lower halves 2, 3. Moreover, suction heads 31, 31 of the first arm portion 34c are located on the provisional mounting table 39b to suck and hold protective sheet 14 located on the provisional mounting table 39b. Further, the first arm portion 34d is located at the punching position to suck and hold protective sheets 14 punched from the original sheet 22.

Further, when the rotation arm 33 is rotated by 90 degrees in the direction indicated by arrow $X_3$ in FIG. 1 by the drive mechanism 36, suction heads 31, 31 of the first arm 34a are moved to the punching position to suck and hold protective sheets punched from the original sheet 22. At this time, suction heads 31, 31 of the first arm 34b are located on the provisional mounting table 39a to suck and hold the protective sheet 14 placed on the provisional mounting table 39b. Further, suction heads 31, 31 of the first arm portion 34c are moved to the supply position from the provisional mounting table 39b to deliver the protective sheet 14 to the upper and lower halves 2, 3. In addition, the first arm portion 34d is moved from the punching position to the provisional mounting table 39b to provisionally mount or place protective sheet 14 on the provisional mounting table 39b.

Namely, the supply mechanism 25 rotates the rotation arm 33 by substantially 90 degrees in the direction indicated by arrow $X_2$ or in the direction indicated by arrow $X_3$ in FIG. 1, to thereby alternately carry the protective sheet 14 from the punching position to the provisional mounting tables 39a, 39b by the first arms 34a, 34d, and to alternately carry the protective sheet 14 from the provisional mounting tables 39a, 39b to the supply position of the carrying mechanism 21 by the first arms 34b, 34c, thus to supply the protective sheet 14 to disc accommodating portion 8 of the upper and lower halves 2, 3.

Figure 4:
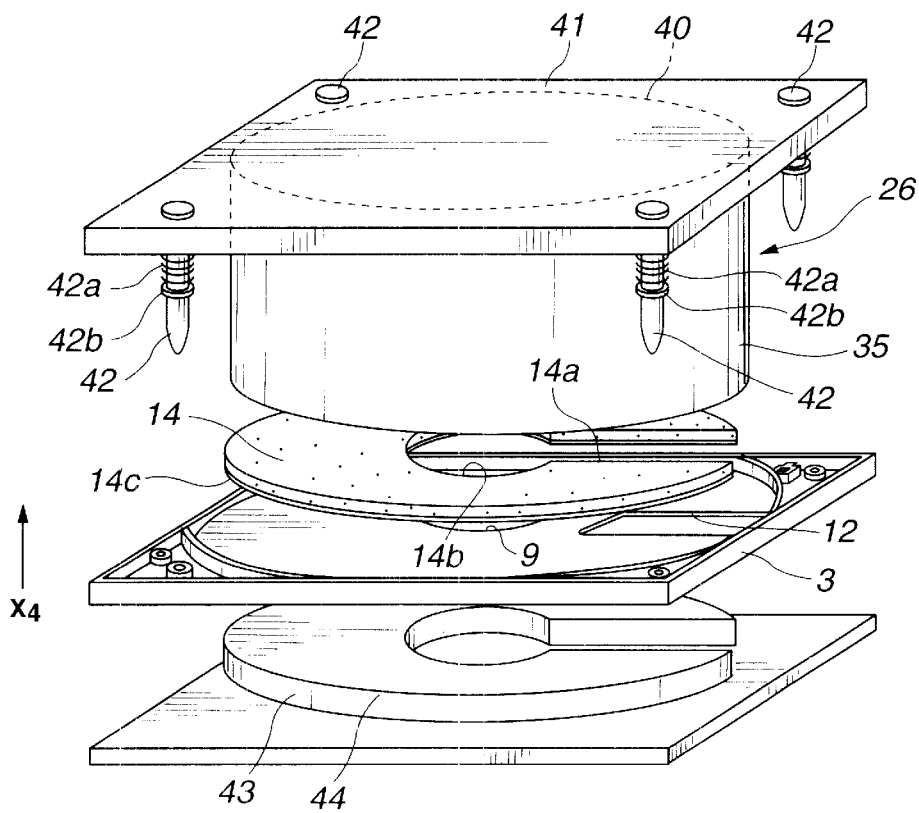
FIG. 4 is a perspective view of a supporting mechanism which presses the lower half with respect to the fusing mechanism, to fixedly fuse the protective sheet onto the lower half.

In addition, at the downstream side in the direction indicated by arrow $X_1$ in FIG. 1 from the supply position of the protective sheet 14 of the carrying mechanism 21, there is provided, as shown in FIG. 1, a fusing mechanism 26 for fixedly fusing, with respect to the upper and lower halves 2, 3, protective sheets 14 delivered to the upper and lower halves 2, 3. As shown in FIG. 4, this fusing mechanism 26 is fixedly disposed in a manner opposite to the supporting mechanism 27 wherein it is positioned at the upper side of the upper and lower halves 2, 3 held by the carrying mechanism 21.

Figure 5:
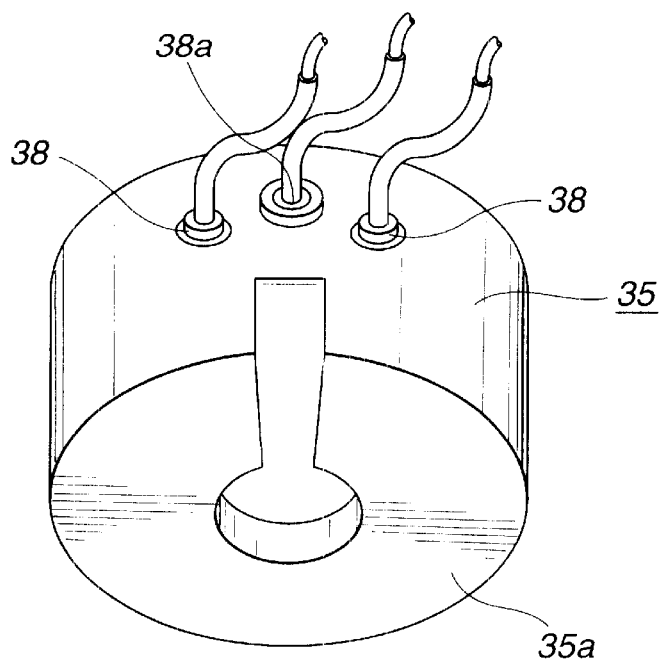
FIG. 5 is a perspective view showing a fusing head.

The fusing mechanism 26 includes a fusing head 35 for fusing a thermal fusible layer 14c of the protective sheet 14. At this fusing head 35, as shown in FIG. 5, there is formed, at the front end portion thereof, a fusing portion 35a for fixedly fusing a protective sheet 14 on to the inner surface sides of the upper and lower halves 2, 3. The fusing head 35 is formed by a material such as a metal having excellent thermal conductivity, etc., and is adapted so that heaters 38 are embedded therewithin. The heater 38 serves to heat the fusing portion 35a of the fusing head 35 up to such a temperature that the thermal fusible layer 14c of the protective sheets 14 is fused. Specifically, the fusing portion 35a of the fusing head 35 is heated so as to have 130 degrees C. to 135 degrees C. in fixedly fusing the protective sheet 14 onto the inner surface sides of the upper and lower halves 2, 3. This temperature is sufficient to fuse only a thermal fusible layer 14c without damaging the body portion of the protective sheet 14 consisting of unwoven cloth, such as rayon.

Moreover, at the fusing head 35, as shown in FIG. 5, there are provided thermocouplers 38a used for measuring the temperature of this fusing head 35 to control the heating temperature of the fusing head 35.

The front end surface side at which fusing portion 35a of the fusing head 35 is formed has an outer shape slightly larger than that of the protective sheet 14, wherein a first cut portion is provided in correspondence with the cut portion 14a of the protective sheet 14, and there is provided a first opening portion 37 corresponding to an opening portion 14b in a manner continuous to the first cut portion. Since the fusing head 35 used here is used for fixedly fusing the entire surface of the protective sheet 14 with respect to inner surfaces of the upper and lower halves 2, 3, substantially the entire surface of the portion except for the portions where the first cut portion and the first opening portion 37 are formed, is caused to be a flat fusing portion 35a. Namely, the fusing portion 35a in contact with the protective sheet 14 is formed so as to have a size to cover the entire surface of the protective sheet 14.

Meanwhile, in the protective sheet 14 disposed within the cartridge body 4, there may be employed protective sheets such that when a magnetic disc 5 is rotationally driven, protective sheets are attached on the inner surfaces of the upper and lower halves 2, 3 so as to come into contact with the magnetic disc 5, as the result of the fact that a portion thereof floats within the cartridge body 4 to permit cleaning of the magnetic disc 5. The protective sheet 14 disposed within the cartridge body 4 so that a portion thereof floats within the cartridge body 4 as stated above, is such that only one end side of the opening portion 14b side is fixedly fused over the angular range of, e.g., 45 degrees, and the other end side is attached toward the inner surfaces of the upper and lower halves 2, 3 with the other end side being a non-fusing portion.

Figure 6:
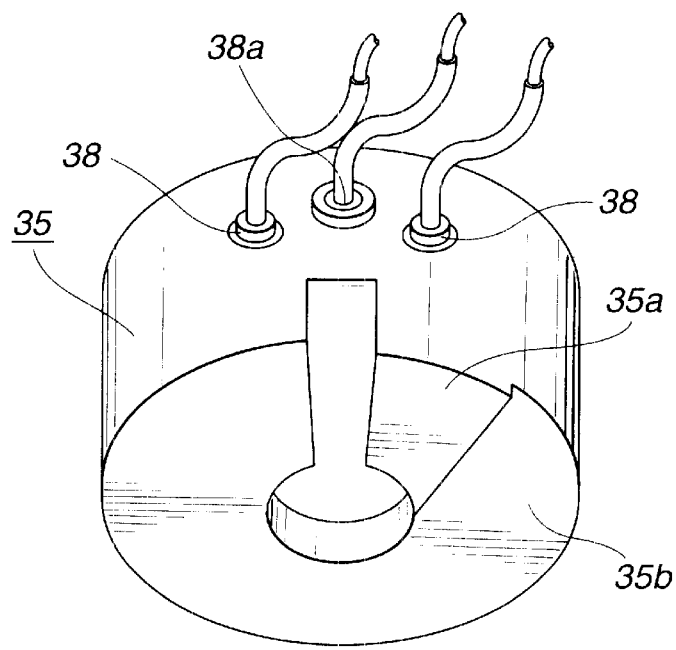
FIG. 6 is a perspective view showing another example of the fusing head.

In the manner stated above, in the fusing head 35 for fixedly fusing only a portion of the protective sheet 14, as shown in FIG. 6, the fusing portion 35a is provided in correspondence with the portion fixedly fused onto the inner surfaces of upper and lower halves 2, 3 of the protective sheet 14 and the portion corresponding to the non-fusing portion is caused to be a cut step portion 35b. This cut step portion 35b is formed so as to have a depth substantially corresponding to the thickness of the protective sheet 14 and serves to prevent the protective sheet 14 from being pressed when the fusing head 35 comes into contact with the protective sheet 14. The portion in which pressing of the fusing head 35 of the protective sheet 14 is avoided, is the portion in which fusing of the thermal fusible layer 14c is avoided so that fixedly fusing with respect to the inner surfaces of the upper and lower halves 2, 3 is prevented, resulting in a non-fusible portion.

Further, the fusing head 35 constituting the fusing mechanism 26 is supported by a pressing mechanism 40 for pressing the upper and lower halves 2, 3 toward the supporting mechanism 27 side in order to allow the protective sheet 14 to be in pressure-contact with the inner surfaces of the upper and lower halves 2, 3 in fixedly fusing the protective sheet 14 onto the inner surfaces of the upper and lower halves 2, 3 constituting the cartridge body 4. As shown in FIG. 4, the pressing mechanism 40 includes a plate-shaped fusing head supporting plate 41 disposed so as to oppose the upper and lower halves 2, 3 and four pressing supporting members 42 for supporting this fusing head supporting plate 41. The fusing head supporting plate 41 has a size to such an extent that at least a fusing mechanism 26 is inscribed, and is formed so as to have the same size as the principal surface opposite to the magnetic disc 5 of the upper and lower halves 2, 3. This fusing head supporting plate 41 is positioned at the central portion of the inner surface sides opposite to the upper and lower halves 2, 3 supported by the supporting mechanism 27 to support the fusing head 35. Four pressing supporting members 42 are attached to the fusing head supporting plate 41 in such a manner that their front end portions are engaged with the portions in the vicinity of the corner portions of the upper and lower halves 2, 3 supported by the supporting mechanism 27, and are supported so that they can be advanced and withdrawn in the thickness direction of the fusing head supporting plate 41. These pressing supporting members 42 are adapted so that, by coil springs 42a disposed between the respective pressure supporting members 42 and the fusing head supporting plate 41, the front end sides thereof are projected or protruded from the fusing head supporting plate 41 and are biased in a manner to come into pressure-contact with the upper and lower halves 2, 3 supported by the supporting mechanism 27.

In this example, the coil springs 42a are disposed in the state compressed between flange portions 42b provided at the middle portions of the respective pressing supporting members 42 and the fusing head supporting plate 41, to thereby bias the respective pressing supportive members 42 in a manner to project them toward the upper and lower halves 2, 3 sides supported by the supporting mechanism 27.

The pressing mechanism 40 constituted in this way functions as follows. When the fusing mechanism 26 fixedly fuses the protective sheet 14 onto the upper and lower halves 2, 3, the pressing mechanism 40 presses and supports corner portions of the upper and lower halves 2, 3 supported by supporting mechanism 27 by means of the pressing members 42 to thereby prevent floating, etc., of the upper and lower halves 2, 3.

Figure 7:
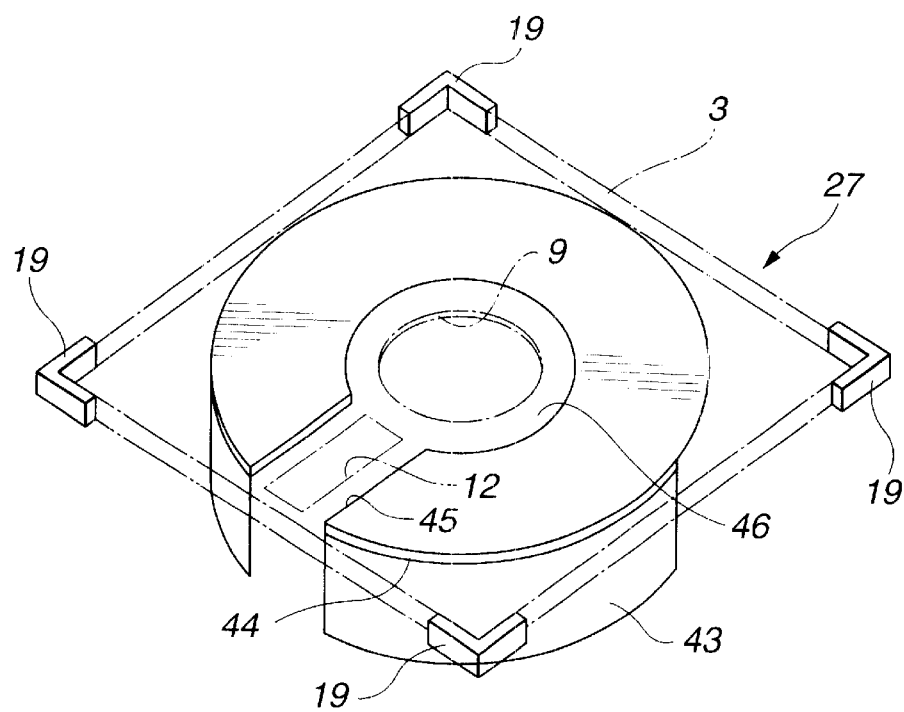
FIG. 7 is a perspective view showing a supporting mechanism for supporting the lower half in the state opposed to fusing mechanism.

In fixedly fusing the protective sheet 14 with respect to the upper and lower halves 2, 3, the supporting mechanism 27 for supporting upper and lower halves 2, 3 is movably disposed, as shown in FIG. 7, in directions such that it becomes close to the fusing mechanism 26 and is away therefrom at the center of the holding mechanism 18. The supporting mechanism 27 includes a supporting table 43 for supporting the upper and lower halves 2, 3. This supporting table 43 is provided at the side opposite to the fusing mechanism 26 with a supporting member 44 for supporting the upper and lower halves 2, 3. This supporting member 44 has an outer shape of contact surface slightly larger than that of the protective sheet 14, and is adapted so that a second cut portion 45 is provided in correspondence with cut portion 14a of the protective sheet 14, and a second opening portion 46 is provided in a manner continuous to the second cut portion 45 and in correspondence with the opening portion 14b. Moreover, the supporting member 44 is formed by an elastic member such as rubber, etc. When the upper and lower halves 2, 3 are caused to be close to the fusing head 35, the entire areas where the protective sheets 14 are fixedly fused of the upper and lower halves 2, 3, are uniformly pressed. Thus, the entire surfaces of the protective sheets 14 are fixedly fused onto the inner surfaces of the upper and lower halves 2, 3 constituting the disc accommodating portion 8.

Figure 8:
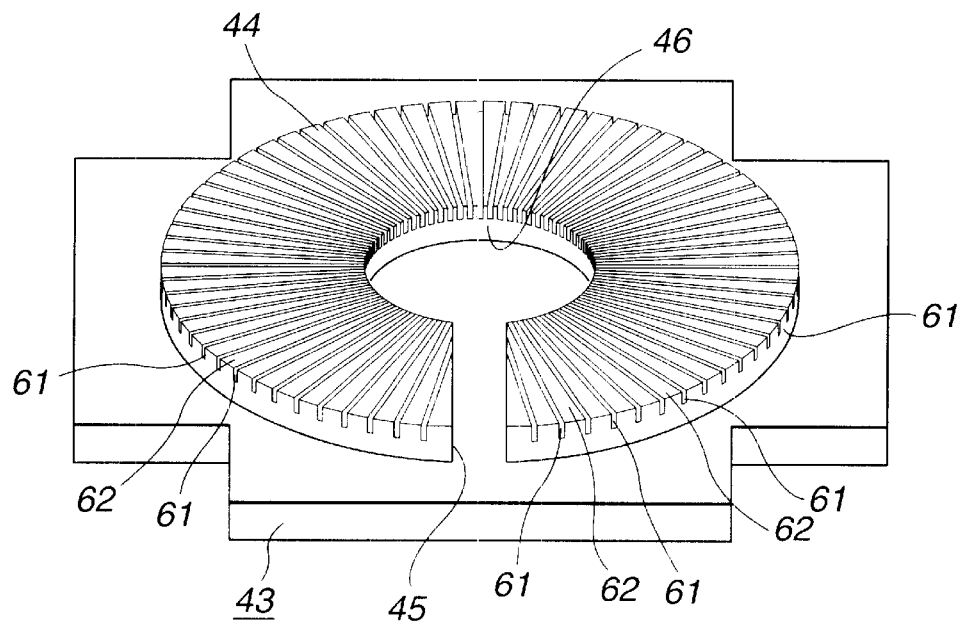
FIG. 8 is a perspective view showing another example of a supporting table for supporting the upper and lower halves.

While, in the example shown in FIG. 7, the supporting member 44 is adapted so that the entire surfaces of the supporting surfaces of the upper and lower halves 2, 3 are formed as flat surface, plural groove portions 61 may be radially provided, as shown in FIG. 8, at the supporting surface with the center of the circular second opening portion 46 provided at the central portion being as a center to provide elastic displacement easy portions 62 between respective groove portions 61. As stated above, plural groove portions 61 are provided at the supporting surfaces of the upper and lower halves 2, 3 to form elastic displacement easy portions 62, whereby when upper and lower halves 2, 3 having deformation such as warp or undulation, etc. are mounted so that they are pressed and supported by the pressing mechanism 40 to which fusing head 35 is attached, the elastic displacement easy portions 62 are caused to undergo elastic displacement following deformation of the upper and lower halves 2, 3, thus making it possible to uniformly support the entire surfaces of the upper and lower halves 2, 3.

In this example, the groove portion 61 is formed so that the angular range is 3 degrees to 35 degrees, the width is 0.1 mm to 1 mm and depth is 0.1 mm to 5 mm.

Moreover, in this supporting member 44, even in the case where there are mounted upper and lower halves 2, 3 where the label sticking portion and/or slide portion of the shutter member are provided so that offset portions are formed, it is possible to absorb such offset portions to uniformly support the entire surfaces of the upper and lower halves 2, 3. As the result of the fact that the upper and lower halves 2, 3 are uniformly supported by the supporting member 44, the protective sheets 14 are securely press-fitted onto the inner surfaces of the upper and lower halves 2, 3 by the fusing portion 35a of the fusing head 35, thus making it possible to securely and fixedly fuse the portion corresponding to the fusing portion 35a onto the inner surfaces of the upper and lower halves 2, 3.

Figure 9:
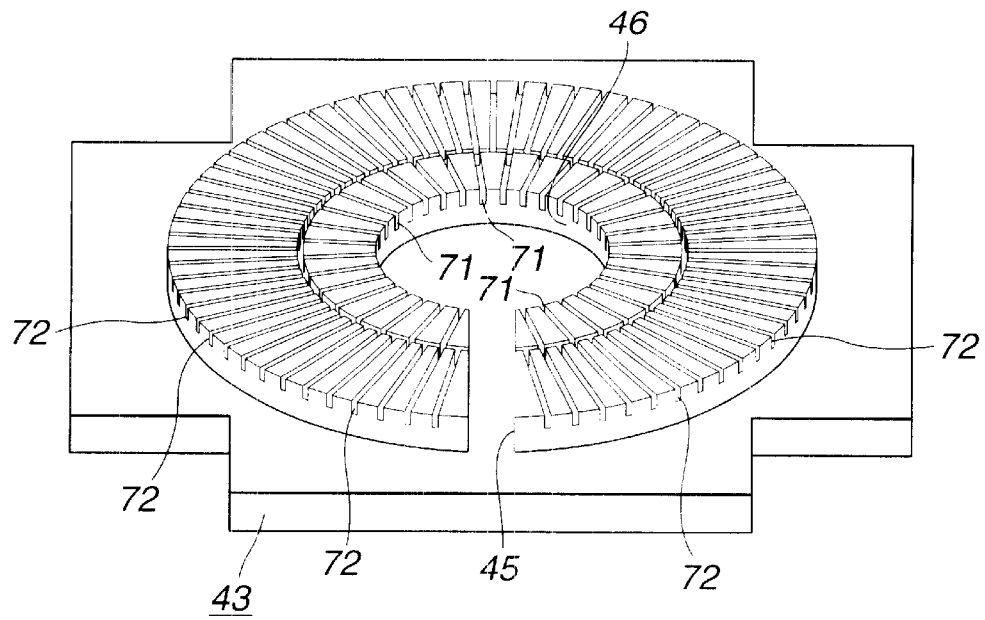
FIG. 9 is a perspective view showing a further example of a supporting table for supporting the upper and lower halves.

While the supporting member 44 shown in FIG. 8 is adapted so that groove portions 61 are continuously formed over inner and outer circumferences of the supporting member 44, it may be formed in a manner separated into inner circumferential side groove portions 71 and outer circumferential side grooves 72 formed radially as shown in FIG. 9. In this case, formation angles of the inner circumferential side groove portion 71 and outer circumferential side groove portion 72 are caused to be different from each other. The formation angle of the outer circumferential side groove portion 72 is caused to be smaller than the formation angle of the inner circumferential side groove portion 71, thereby permitting elastic piece forces of elastic displacement easy portions formed between respective inner circumferential groove portions 71 and respective outer circumferential side groove portions 72 to be substantially equal to each other over the inner and outer circumferences. Thus, it is possible to more securely and uniformly support, in a more stable state, entire surfaces of the upper and lower halves 2, 3, where deformation has taken place or upper and lower halves 2, 3 in which offset portions are formed at the outer surface side.

Figure 10:
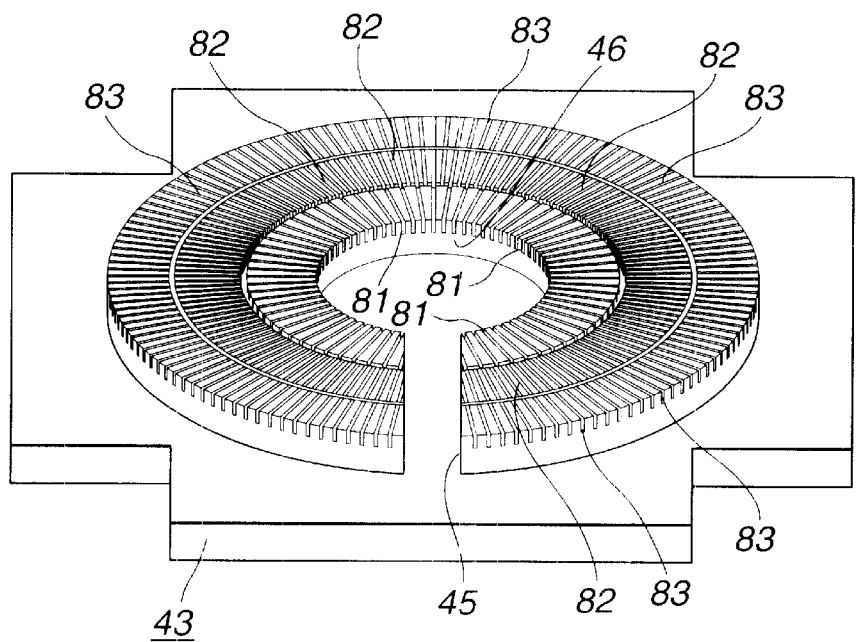
FIG. 10 is a perspective view showing a still further example of a supporting table for supporting the upper and lower halves.

Further, at the supporting surface of the supporting member 44, as shown in FIG. 10, there may be formed inner circumferential side groove portions 81, intermediate groove portions 82 and outer circumferential side groove portions 83, radially in a separate form. In this case, formation angles of the inner circumferential side groove portions 81, the intermediate groove portions 82 and the outer circumferential side groove portions 83 are caused to be different. By allowing the formation angles of the intermediate groove portions 82 and the outer circumferential side groove portions 83 to be smaller than the formation angle of the inner circumferential side groove portions 81, elastic piece forces of elastic displacement easy portions formed between the respective inner circumferential side groove portions 81, the respective intermediate groove portions 82 and the respective outer circumferential side groove portions 83 can be substantially equal to each other over the inner and outer circumferences. Thus, it is possible to more reliably and uniformly support, in a more stable state, the entire surfaces of the upper and lower halves 2, 3 in which deformation takes place and/or the upper and lower halves 2, 3 in which offset portions are formed at the outer surface side.

Particularly, as shown in FIG. 10, the inner circumferential side groove portions 81, the intermediate groove portions 82 and the outer circumferential side groove portions 83 are formed radially in a separate manner, thereby making it possible to securely and uniformly support even the entire surface of the upper and lower halves 2, 3 in which warp or undulation partially takes place.

The supporting mechanism 27 provided with supporting member 44 as described above operates as follows, as shown in FIGS. 4 and 7 when upper and lower halves 2, 3 on which protective sheets are mounted are located at a fusing position where such protective sheets 14 are fixedly fused onto the inner surfaces of the upper and lower halves 2, 3 constituting the cartridge body 4. Namely, when the upper and lower halves 2, 3 on which respective protective sheets 14 are mounted are carried up to the fusing position, the supporting table 43 is moved in the direction indicated by arrow $X_4$ in FIG. 4, where it becomes close to the fusing head 35 by a drive mechanism for driving the supporting mechanism 27. Thus, the upper and lower halves 2, 3 are put between the fusing head 35 and the supporting table 43. At this time, the fusing portion 35a of the fusing head 35 fuses the thermal fusible layer 14c of the protective sheet 14 to fixedly fuse it onto the inner surfaces of upper and lower halves 2, 3 constituting the cartridge body 4. At this time, the fusing head 35 and the supporting table 43 for supporting outer surfaces of the upper and lower halves 2, 3, are formed so as to have an outer shape slightly larger than that of the protective sheet 14 and the supporting member 44 of the supporting table 43 is formed by an elastic member. For this reason, fusing of the protective sheet 14 is carried out while uniformly supporting the upper and lower halves 2, 3. Accordingly, the portion corresponding to fusing portion 35a is securely and fixedly fused onto the inner surfaces of the upper and lower halves 2, 3.

Figure 11:
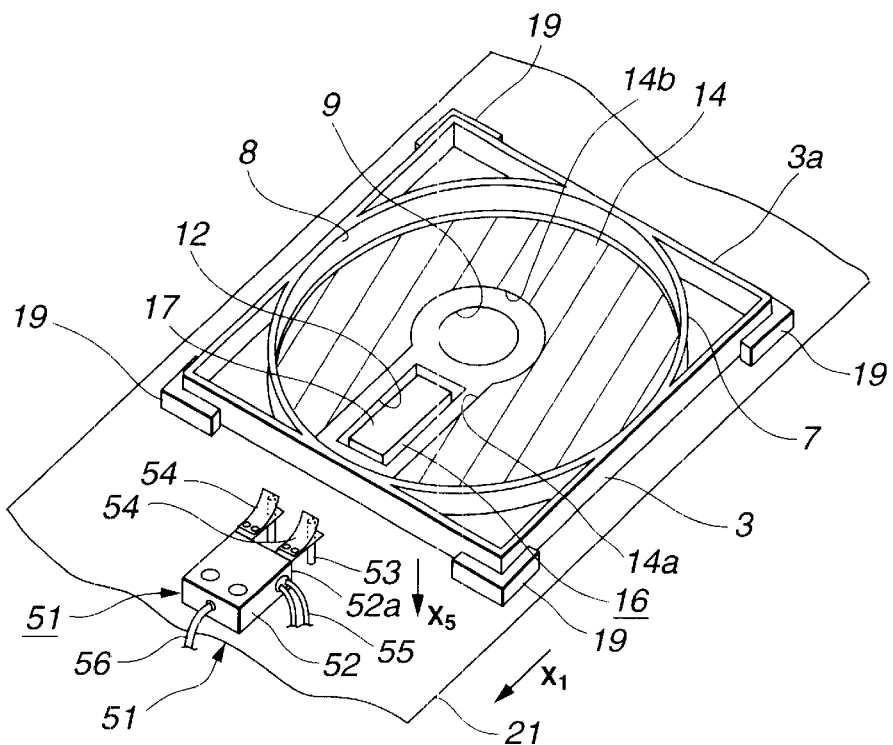
FIG. 11 is a perspective view showing a provisional fixing or attachment mechanism for provisionally fixing a protective sheet with respect to the upper and lower halves.

Further, between the supply position where protective sheets 14 are supplied to the upper and lower halves 2, 3 of the carrying mechanism 21 and fusing position where protective sheets 14 are fixedly fused onto the upper and lower halves 2, 3, there is provided a provisional attachment mechanism 51 for provisionally attaching or fixing the protective sheets 14 onto the upper and lower halves 2, 3 before the entire surfaces of the protective sheets 14 are fixedly fused onto the upper and lower halves 2, 3. This provisional attachment mechanism 51 includes, as shown in FIG. 11, a provisional attachment member 52 for provisionally attaching the protective sheets 14, 14 by the peripheral edges of the opening portions 11, 12 of the upper and lower halves 2, 3. The provisional attachment member 52 is formed to be substantially L shaped and a vertical surface portion 52a is opposed to the front sides of the upper and lower halves 2, 3 carried by the carrying mechanism 21. Further, the provisional attachment member 52 is movably disposed in a direction indicated by arrow $X_5$ or in a direction opposite to the arrow $X_5$ in FIG. 11 perpendicular to the traveling direction of the upper and lower halves 2, 3. In addition, at the vertical surface portion 52a side, supporting arms are provided in a vertically projected manner (hereinafter simply referred to as projected, as the occasion may demand). At the front end portions of the supporting arms, pin-shaped fusible portions 53 are supported so that they are advanced and withdrawn in the direction indicated by arrow $X_5$ and in the direction opposed to arrow $X_5$ in FIG. 11. The fusible portions 53 are pressed and biased toward the upper and lower halves 2, 3 side carried by the carrying mechanism 21 in the direction indicated by arrow $X_5$ in FIG. 11 by means of leaf springs 54 extended onto the supporting arm.

At the provisional attachment member 52, there are provided a heater 55 for heating the fusing portion 53 and a thermocouple 56 for detecting the temperature of the provisional attachment member 52 to control the temperature of the fusing portion 53. The fusing portion 53 is heated by the provisional attachment member 52 heated by the heater 55. In view of the above, the fusing portion 53 is formed by a metal having excellent thermal conductivity, so that heat from the provisional attachment member 52 is efficiently conducted. In this example, the fusing portion 53 is heated so that its temperature becomes equal to 100 degrees C. to 160 degrees C.

In such a provisional attachment mechanism 51, when the upper and lower halves 2, 3 on which protective sheets 14 are mounted are carried by the carrying mechanism 21 before protective sheets 14 are fixedly fused onto the inner surfaces of the upper and lower halves 2, 3 by the fusing mechanism 26, the fusing portion 53 rides over a vertically projecting wall 3a formed at the periphery of the upper and lower halves 2, 3 while advancing or withdrawing in the direction indicated by arrow $X_5$ or in the direction opposite to the arrow $X_5$ in FIG. 11 against the biasing force of the leaf springs 54, to admit into the upper and lower halves 2, 3 to partially press the protective sheets 14, 14 by peripheral edges of the opening portions 11, 12. At this time, since the fusing portion 53 is heated by the heater 55 provided at the provisional attachment member 52, the thermal fusible layer 14c is fused by the front end portion thereof to thereby fixedly fuse the protective sheets 14, 14 onto the upper and lower halves 2, 3 in a dotted point form to carry out provisional attachment. The fusing portions 53 in which the provisional attachment of the protective sheets 14, 14 has been carried out are once moved in a direction away from the upper and lower halves 2, 3 which is the direction opposite to arrow $X_5$ in FIG. 11, and are moved in the direction indicated by arrow $X_5$ in FIG. 11 up to the lower side of the carrying mechanism 21 so that they do not prevent or impede carrying of the upper and lower halves 2, 3 to be carried. In this example, in the protective sheet 14, as the result of the fact that the engagement portion 17 of the positioning mechanism 16 for realizing the positioning of the above-described upper and lower halves 2, 3 is engaged with the opening portions 11, 12, a positional shift of the upper and lower halves 2, 3 is prevented in provisionally attaching the protective sheets 14 onto the upper and lower halves 2, 3.

Figure 12:
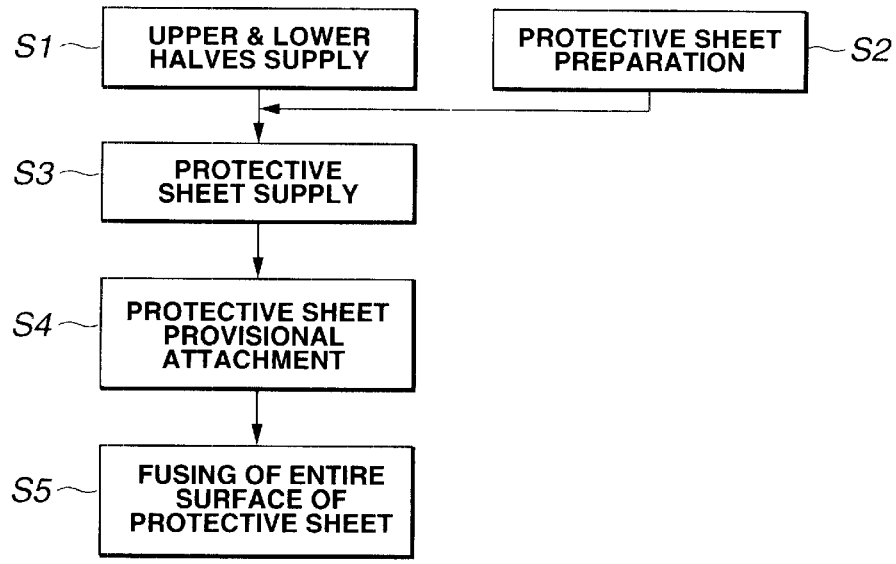
FIG. 12 is a flowchart showing the attachment steps of the protective sheet.

The operation of the attachment apparatus 20 attaching protective sheets 14 with respect to such upper half 2 and lower half 3 will now be described in correspondence with the attachment steps of the protective sheet 14 shown in FIG. 12. Initially, at step S1, upper and lower halves 2, 3 are supplied to a carrying mechanism 21. Specifically, as shown in FIG. 1, the upper and lower halves 2, 3 are supplied in a parallel state with the inner surfaces of the upper and lower halves 2, 3 being placed at the upper side. At this time, upper and lower halves 2, 3 are delivered as a pair to the carrying mechanism 21. Further, the upper and lower halves 2, 3 delivered to the carrying mechanism 21 are held by a holding mechanism 18 as shown in FIG. 3. In addition, in the upper and lower halves 2, 3 carried by the carrying mechanism 21, as shown in FIG. 3, engagement portion 17 of the positioning mechanism 16 is engaged with opening portions 11, 12 of the upper and lower halves 2, 3. Thus, the upper and lower halves 2, 3 are carried up to the supply position for supplying the protective sheet 14 to the upper and lower halves 2, 3 in the state caused to undergo positioning.

On the other hand, in the original sheet supply mechanism 23 of the protective sheet 14, at step S2, as shown in FIG.

1, the original sheet 22 is traveled in the direction indicated by arrow $X_1$ in FIG. 3, which is the same direction as the carrying direction of the upper and lower halves 2, 3 from the supply portion 28. Namely, the original sheet 22 is sent out from the supply portion 28 for delivering the original sheet 22 and is wound by winding reel 29. At the punching position of the protective sheet 14 in the middle, the original sheet 22 is punched by the punching mechanism 24 so that protective sheets 14 are formed. At this time, the winding reel 29 is driven in a manner synchronous with the carrying mechanism 21. Namely, the winding reel 29 is stopped when the carrying mechanism 21 is stopped and is re-driven when the carrying mechanism 21 restarts the drive. Thus, in the original sheet supply mechanism 23, when there is the state where the carrying mechanism 21 is stopped so that it is impossible to deliver protective sheets 14 to the upper and lower halves 2, 3, the original sheet 22 is prevented from being traveled, thus making it possible to eliminate wastefulness of the original sheet 22.

Further, when the protective sheets 14 are formed, the protective sheets are carried up to the supply position of the carrying mechanism 21 from the punching position by the supply mechanism 25 at step S3, and are supplied to the upper and lower halves 2, 3 of the supply position. As shown in FIG. 1, in the supply mechanism 25, by rotating the rotation arm 33 in the direction indicated by arrow $X_2$ or in the direction indicated by arrow $X_3$ in FIG. 1 by substantially 90 degrees, the protective sheets 14 are carried from the punching position to provisional attachment tables 39a, 39b alternately by first arms 34a, 34d, and are carried to the supply position of the carrying mechanism 21 from the provisional mounting tables 39a, 39b alternately by first arms 34b, 34c, to deliver the protective sheets 14 to the disc accommodating portion 8 of the upper and lower halves 2, 3. Further, the upper and lower halves 2, 3 to which protective sheets 14 are delivered are further carried in the direction indicated by arrow $X_1$ in FIG. 1 by the carrying mechanism 21.

Further, in the upper and lower halves 2, 3 to which the protective sheets 14 have been supplied, at step S4, protective sheets 14 are provisionally attached by a provisional attachment mechanism 51. Namely, as shown in FIG. 11, in the provisional attachment mechanism 51, pin-shaped fusible portions 53 ride over the rising wall 3a formed at the periphery of the upper and lower halves 2, 3 while the pin-shaped fusible portion 53 advances and withdraws in the direction opposite to arrow $X_5$ and in the direction indicated by arrow $X_5$ in FIG. 11 against the biasing force of the leaf springs 54, to be admitted into the upper and lower halves 2, 3, to partially press the protective sheets 14, 14 by the peripheral edges of the opening portions 11, 12, to fuse the thermal fusible layers 14c of this portion in a dotted point form to provisionally attach them on the inner surfaces of the upper and lower halves 2, 3. Thus, the provisional attachment member 52 is moved away from the portions within the upper and lower halves 2, 3 while being advanced and withdrawn in the direction opposite to arrow $X_5$ and in the direction indicated by arrow $X_5$ in FIG. 11, against the biasing force of the leaf springs 54 for a second time, and is then moved in the direction indicated by arrow $X_5$ in FIG. 11 up to the lower side of the carrying mechanism 21, so that there does not result any impedance to the carrying of the upper and lower halves 2, 3. Further, the upper and lower halves 2, 3 in which the protective sheets 14 are provisionally attached to the peripheral portions of the opening portions 11, 12 are further carried in the direction indicated by arrow $X_1$ in FIG. 1 by the carrying mechanism 21. In this example, after the protective sheets 14 are provisionally attached to the upper and lower halves 2, 3, the attachment apparatus 20 detects the presence or absence of the protective sheet 14 as to whether or not the protective sheets 14 are delivered to the upper and lower halves 2, 3. In addition, only upper and lower halves 2, 3 to which the protective sheets have been delivered are advanced to the next step. Thus, the entire surfaces of the protective sheets 14 are fixedly fused onto disc accommodating portion 8 of the upper and lower halves 2, 3.

Then, the upper and lower halves 2, 3 at which the protective sheets 14 are provisionally attached, are carried up to the fusing position where the protective sheets 14 are fixedly fused or attached. Then, at step S5, the protective sheets 14 are fixedly fused with respect to the disc accommodating portion 8 of the upper and lower halves 2, 3 by the fusing mechanism 26. Namely, as shown in FIG. 4, the protective sheet 14 is moved in the direction indicated by arrow $X_4$ in FIG. 4, where the supporting table 43 of the supporting mechanism 27 becomes close to the fusing head 35. Thus, the upper and lower halves 2, 3 are put between the fusing head 35 and the supporting table 43. At this time, since thermal fusible layer 14c of the protective sheet 14 is heated so that its temperature becomes equal to the fusible temperature, the fusing portion 35a of the fusing head 35 is fixedly fused onto the inner surfaces of the upper and lower halves 2, 3 constituting the cartridge body 4. Moreover, the contact surface in contact with the protective sheet 14 of the fusing head 35 and the supporting table 43 for supporting the outer surfaces of the upper and lower halves 2, 3 are formed so as to have an outer shape slightly larger than that of the protective sheet 14, and the supporting member 44 of the supporting table 43 is formed by an elastic member. For this reason, the portions corresponding to fusible portions 35a of the protective sheets 14 are fixedly and securely fused at predetermined fusing positions of the inner surfaces of the upper and lower halves 2, 3 in the state where the entire surfaces of the upper and lower halves 2, 3 are uniformly supported by the supporting member 44.

Thereafter, when the portions corresponding to the fusible portions 35a of the protective sheets 14 are fixedly fused onto the inner surfaces of the upper and lower halves 2, 3, the upper and lower halves 2, 3 are further carried by the carrying mechanism 21. Then, there is carried out a test as to whether or not the protective sheets 14 are fixedly and securely fused with respect to the disc accommodating portion 8 formed at the inner surface side of the upper and lower halves 2, 3. By this test step, the following operation is carried out. When the protective sheet is attached in a manner positionally shifted from a predetermined position of the upper or lower half 2, 3—e.g., when the predetermined fusible portion of the protective sheet 14 is not securely stuck onto the upper or lower half 2, 3, etc., the corresponding protective sheet is ejected from the carrying mechanism 21. Only when the protective sheet 14 is stuck at a predetermined position of the upper or lower half 2, 3, the processing proceeds to the next step. Additionally, also at this test step, the upper and lower halves 2, 3 may be caused to undergo positioning by the positioning mechanism 16.

As stated above, after the protective sheets 14 are stuck onto the upper and lower halves 2, 3, the magnetic disc 5 to which the hub 6 is attached, is supplied to the disc accommodating portions 8 of either one of the upper half 2 and the lower half 3. Thereafter, either the other of the halves of the upper half 2 and the lower half 3 to which no magnetic disc 5 is delivered, is assembled into the inverted one half to which the magnetic disc 5 is delivered by thermal caulking. Thereafter, the shutter 13 is assembled with respect to the entire surface of the cartridge body 4 into which the upper and lower halves 2, 3 are assembled. Thus, the disc cartridge 1 is completed.

In accordance with the attachment apparatus 20 and the attachment method for the protective sheet 14 which protects the magnetic disc 5 which is rotatably accommodated within the cartridge body 4, since the entire surface of the protective sheet 14 is attached with respect to the disc accommodating portion 8 of the upper and lower halves 2, 3 carried by the carrying mechanism 21, the protective sheets 14 are securely stuck with respect to the disc accommodating portion 8. Accordingly, in the disc cartridge 1, it is possible to securely sweep foreign material such as dust, etc., attached on the magnetic disc 5 which is rotatably accommodated within the cartridge body 4. Thus, the occurrence of recording/reproduction error can be prevented. In addition, since the supporting member 44 constituting the supporting mechanism 27 is formed by an elastic member such as rubber, etc., when the upper and lower halves 2, 3 are brought close to the fusing head 35, the portion of the protective sheet 14 of the upper and lower halves 2, 3, which is fixedly fused by the fusing portion 35a of the fusing head 35, is securely pressed. Thus, protective sheets 14 are fixedly and securely fused at predetermined positions of the upper and lower halves constituting the disc accommodating portion 8.

While explanation has been given in connection with the attachment apparatus 20 for the protective sheet 14 used in a disc cartridge 1 using a magnetic disc 5 having flexibility, this invention is applied to attachment apparatuses and attachment methods for a protective sheet used in the disc cartridge within which there are accommodated a hard magnetic disc, a magneto-optical disc, and an optical disc, etc., using a base having rigidity as a recording medium, thereby making it possible to provide the merits or advantages as described above.

In accordance with this invention, since the supporting mechanism and the fusing mechanism are formed so as to have an outer shape slightly larger than that of the disc protective sheet, the disc protective sheet on which the thermal fusible layer is formed can be fixedly and securely fused onto the surface opposite to the disc of the upper and lower halves constituting the cartridge body. The disc cartridge provided with the disc protective sheet attached by such an attachment apparatus for a disc protective sheet can sweep foreign material such as dust, etc., attached on the disc, to realize a reliable protection of the disc, thus making it possible to prevent the occurrence of a recording/reproduction error.

What is claimed is:

1. An attachment apparatus for attaching a disc protective sheet to at least one selected body section of a magnetic disc cartridge body formed of two half body sections, comprising:

a supporting mechanism having a perimeter size and shape sufficient to support an entire disc protective sheet and adapted to support the selected body section, said supporting mechanism having a supporting member for supporting the selected body section, said supporting member having a supporting surface for supporting the selected body section, said supporting surface including a plurality of grooves formed therein;

wherein said plurality of grooves in said supporting surface form a plurality of elastic members such that the two half body sections are uniformly supported;

a supply mechanism for supplying a disc protective sheet to the selected body section oriented so that an opening in the selected body section and a cut-out in the protective sheet are aligned with one another; and a fusing mechanism having a perimeter size and shape sufficient to contact the entire disc protective sheet, the fusing mechanism being disposed facing the supporting mechanism and being adapted to fixedly fuse a thermal fusible layer of the disc protective sheet onto the selected body section when the selected body section and disc protective sheet are positioned between the fusing mechanism and the supporting mechanism.

2. The attachment apparatus as set forth in claim 1, wherein the selected body section and the disc protective sheet supplied to the selected body section are relatively moved toward the supporting mechanism and the fusing mechanism, whereby the fusing mechanism is pressed with respect to the selected body section so that the protective sheet is fixedly fused onto a surface of the selected body section by the fusing mechanism.

3. The attachment apparatus as set forth in claim 1, wherein the supporting member of the selected body section is formed from a material providing elasticity.

4. The attachment apparatus as set forth in claim 1, further comprising:

a positioning mechanism having an engagement portion that engages the opening in the selected body section to properly position the selected body section.

5. The attachment apparatus as set forth in claim 1, further comprising:

a pressing mechanism for pressing the selected body section toward the supporting mechanism in fixedly fusing the disc protective sheet onto the selected body section.

6. The attachment apparatus as set forth in claim 1, further comprising:

a provisional attachment mechanism for fixedly fusing and provisionally attaching the disc protective sheet near the opening with respect to a peripheral edge portion of the opening after the disc protective sheet is supplied to the selected body section.

7. The attachment apparatus as set forth in claim 1, further comprising:

a conveyor mechanism including a conveyor belt for supplying in succession adjacent pairs of body sections of a plurality of cartridge bodies to the supporting mechanism and fusing mechanism for fusing a disc protective sheet to each body section of each cartridge body.

* * * * *